(12) United States Patent
Akimori et al.

(10) Patent No.: US 9,315,925 B2
(45) Date of Patent: Apr. 19, 2016

(54) LAYERED PRODUCT AND TEXTILE PRODUCT COMPRISING THE SAME

(75) Inventors: Junichi Akimori, Akaiwa (JP); Hiroki Sadato, Okayama (JP)

(73) Assignee: W. L. Gore & Associates, Co., Ltd., Tokyo (JP)

( * ) Notice: Subject to any disclaimer, the term of this patent is extended or adjusted under 35 U.S.C. 154(b) by 1074 days.

(21) Appl. No.: 11/908,160

(22) PCT Filed: Mar. 10, 2006

(86) PCT No.: PCT/JP2006/304774
§ 371 (c)(1),
(2), (4) Date: Feb. 14, 2008

(87) PCT Pub. No.: WO2006/095863
PCT Pub. Date: Sep. 14, 2006

(65) Prior Publication Data
US 2009/0029617 A1    Jan. 29, 2009

(30) Foreign Application Priority Data
Mar. 10, 2005   (JP) ................... 2005-068000

(51) Int. Cl.
*B29C 65/02*   (2006.01)
*D03D 15/00*   (2006.01)
(Continued)

(52) U.S. Cl.
CPC .............. *D03D 15/00* (2013.01); *A41D 27/245* (2013.01); *B29C 65/02* (2013.01); *B32B 5/02* (2013.01);
(Continued)

(58) Field of Classification Search
CPC .......... D05D 2305/00; D05D 2305/26; D05D 2305/30; B29C 65/02; A41D 27/24; A41D 27/245

USPC ..................... 442/76, 77, 79, 85, 86, 88, 203
See application file for complete search history.

(56) References Cited

U.S. PATENT DOCUMENTS

| 4,734,320 A | 3/1988 | Ohira et al. ................... 428/231 |
| 5,308,689 A * | 5/1994 | Shinkai et al. .................. 442/76 |

(Continued)

FOREIGN PATENT DOCUMENTS

| EP | 1857265 | 11/2007 |
| EP | 1 927 638 | 6/2008 |

(Continued)

OTHER PUBLICATIONS

Humphries, Mary. Fabric Reference. Prentice Hall. Upper Saddle River, NJ. 1992. pp. 94-95.*

(Continued)

*Primary Examiner* — Jenna Johnson
(74) *Attorney, Agent, or Firm* — Kilpatrick Townsend & Stockton LLP

(57) ABSTRACT

The present invention provides a layered product, which, when processed into a textile product by sewing, fusing, or the like, overcomes such a practical restriction that a knit must be used on the side to be subjected to a sealing treatment, makes the sealing treatment easier, has intact appearance and touch feeling, and is lightweight. The layered product comprises a flexible film and a woven fabric layered thereon at the side to be subjected to the sealing treatment in processing the layered product into the textile product. The layered product has a total cover factor ($CF_{total}$) from 700 to 1400, calculated from the cover factors of the warp and the weft constituting the woven fabric.

$$CF_{total} = CF_m + CF_t$$

$CF_m$: cover factor of warps
$CF_t$: cover factor of wefts

23 Claims, 2 Drawing Sheets

(51) Int. Cl.
  A41D 27/24    (2006.01)
  D06M 23/18   (2006.01)
  B32B 5/02    (2006.01)
  B32B 5/26    (2006.01)
  B32B 27/12   (2006.01)
  D03D 11/00   (2006.01)
  A41D 31/02   (2006.01)

(52) U.S. Cl.
  CPC . *B32B 5/26* (2013.01); *B32B 27/12* (2013.01); *D03D 11/00* (2013.01); *D03D 15/0077* (2013.01); *D06M 23/18* (2013.01); *A41D 31/02* (2013.01); *D05D 2305/00* (2013.01); *D10B 2101/08* (2013.01); *D10B 2101/20* (2013.01); *D10B 2201/02* (2013.01); *D10B 2211/02* (2013.01); *D10B 2211/04* (2013.01); *D10B 2321/10* (2013.01); *D10B 2331/02* (2013.01); *D10B 2331/04* (2013.01); *D10B 2401/063* (2013.01); *D10B 2501/00* (2013.01); *D10B 2501/04* (2013.01); *D10B 2503/06* (2013.01); *D10B 2505/18* (2013.01); *Y10T 442/322* (2015.04)

(56) References Cited

U.S. PATENT DOCUMENTS

| | | | |
|---|---|---|---|
| 5,415,924 A * | 5/1995 | Herlihy, Jr. | 442/35 |
| 5,885,679 A * | 3/1999 | Yasue et al. | 428/57 |
| 6,294,487 B1 | 9/2001 | Keshavaraj | 442/218 |
| 6,497,934 B1 * | 12/2002 | Mahn et al. | 428/57 |
| 2005/0114989 A1 * | 6/2005 | Harward | 2/275 |
| 2007/0021023 A1 * | 1/2007 | Altman et al. | 442/364 |

FOREIGN PATENT DOCUMENTS

| | | |
|---|---|---|
| GB | 2 024 100 | 1/1980 |
| HU | 187 183 B | 4/1998 |
| HU | P0300575 | 7/2003 |
| JP | 55-007483 | 1/1980 |
| JP | 4-022629 A | 1/1992 |
| JP | 10-298869 | 11/1998 |
| JP | 2001-503107 | 3/2001 |
| JP | 2001-315236 A | 11/2001 |
| JP | 2002-225209 | 8/2002 |
| JP | 2003-236963 | 8/2003 |
| JP | 2003 311 862 | 11/2003 |
| JP | 2003-311862 A | 11/2003 |
| JP | 2005-206994 A | 8/2005 |

OTHER PUBLICATIONS

Dr. M Jerdran—F. Tarnoky: Manual for Textile Industry (Muszaki Konyvkiado, Budapest, 1979) p. 511.
Janos Gyimesi: Physical analysis of Textile (Muszaki Konykiado, Budapest, 1968) p. 315.
Hungarian Search Report—App No. P0800343 Dated Oct. 5, 2009.
Masahiro Miyauchi, Nobuo Kieda, Shunichi Hishita, Takefumi Mitsuhashi, Akira Nakajima, Toshiya Watanabe, Kazuhito Hashimoto, "Reversible wettability control of $TiO_2$ surface by light irradiation" SUrFACE Science, vol. 511, 2002, pp. 401-407.
Supplemental EP Search Reprot EP 06 71 5544 dated Apr. 23, 2010.
European Search Report EP12157675, dated Apr. 2, 2012, 3 pages.

* cited by examiner

LAYERED PRODUCT AND TEXTILE PRODUCT COMPRISING THE SAME

TECHNICAL FIELD

The present invention relates to textile products such as clothing, sheets, tents, and sleeping bags, and to a layered product (clothing material) constituting those products.

BACKGROUND ART

A layered product where a cloth is laminated on a flexible base material having waterproof or waterproof and moisture-permeability is used for textile products such as garments, sheets, tents, bags, and sleeping bags used in applications where waterproof, dust-proof, wind-proof, or the like is required.

For example, Japanese Patent Publication No. S55-7483 A relates to a water-resistant layered article in a sheet form that has a high moisture vapor transmission rate even under adverse climatic conditions, which is suitable for use in rain-wear garments and tents, and discloses a layered article in which a water repellent nylon taffeta 15, a porous polytetrafluoroethylene film 17 treated with a hydrophilic polyurethane resin and a nylon tricot knit 19 are layered (see, FIG. 3). Japanese Patent Publication No. 2001-503107 A discloses a proper composite lining material for a garment or the like containing a water resistant water-vapor-permeable flexible substrate 21 having a first surface and a second surface, a cloth secured to the first surface of the substrate 21, and a plurality of discrete abrasion resistant polymeric dots 23 provided on the second surface of the substrate 21 (see, FIG. 4). Japanese Patent Publication No. H10-298869 discloses a moisture-permeable waterproof cloth prepared by laminating high-density cloths each having a fiber density which corresponds to not less than 240 yarns expressed in terms of yarns having 70 deniers onto both surfaces of a moisture-permeable waterproof membrane

DISCLOSURE OF THE INVENTION

Such layered products are cut into pieces of desired dimensions, and subjected to sewing or fusing to manufacture textile products such as clothes, sheets, tents, bags, and sleeping bags. A sewed or fused part is generally subjected to a sealing treatment with a sealing tape having a hot melt resin layer in order to prevent the entry of water, chemicals, wind, dust and the like from outside or to increase the strength of the obtained textile product. However, there is such a practical restriction that a knit must be laminated on the side of the layered product which side is to be subjected to the sealing treatment, because of the reasons described below. First, when a knit is not laminated on the side to be subjected to the sealing treatment, impregnation of the hot melt resin of the sealing tape is decreased, which results in an insufficient sealing effect. Second, in the case of processing a layered product into a garment, the sealing treatment is generally performed on the inner liner of the garment. When the garment does not comprise a knit as the inner liner, the flexible base material is exposed and will touch to the skin, and the resulting garment may have impaired appearance and touch feeling.

On the other hand, with respect to the layered product in which a knit is used on the side to be subjected to the sealing treatment (typically becoming the inner side), the problems that the layered product is hardly reduced in weight due to the relatively large weight of the knit and that the knit is degraded by abrasion with a shirt, a button, a Velcro fastening, and the like are pointed out.

The present invention has been achieved in view of the above-described situation, an object of the present invention is to provide a layered product, which overcomes such a practical restriction that the knit must be used on the side to be subjected to the sealing treatment when the layered product is subjected to sewing, fusing, or the like to manufacture the textile product, makes the sealing treatment easier, and has appearance and touch feeling intact, and is lightweight.

The present invention provides a layered product comprising a flexible film and a woven fabric laminated on the flexible film, in which the woven fabric is laminated on the side which is supposed to be subjected to the sealing treatment in processing the layered product into the textile product, and the woven fabric has a total cover factor ($CF_{total}$) from 700 to 1400, calculated from cover factors of warp and weft constituting the woven fabric, according to the following formulas.

$$CF_{total} = CF_m + CF_t$$

$$CF_m = \sqrt{F_m} \times D_m$$

$$CF_t = \sqrt{F_t} \times D_t \qquad \text{[Formula 1]}$$

$CF_m$: cover factor of a warp
$CF_t$: cover factor of a weft
$F_m$: fineness of a warp (dtex)
$F_t$: fineness of a weft (dtex)
$D_m$: density of a warp (counts/2.54 cm)
$D_t$: density of a weft (counts/2.54 cm)

The cover factor indicates roughness of a woven fabric. By setting a total cover factor ($CF_{total}$) calculated from cover factors of the warp and the weft constituting the woven fabric to the range described above, impregnation of the hot melt resin of the sealing tape is improved. The sealing treatment is accordingly performed easier, resulting in an improved sealing treatment effect. In a preferred embodiment, at least one of the cover factors of warps ($CF_m$) and wefts ($CF_t$) is in a range from 300 to 800.

It is also preferable that at least one of the warp and the weft constituting the woven fabric is made of two or more filaments. By using a warp or weft made of two or more filaments, the resultant layered product has soft texture. A fineness of the filament is preferably not more than 12 dtex. By setting the fineness per filament not more than 12 dtex, the resultant layered product has softer texture.

In a preferred embodiment, at least one of the warp and the weft constituting the woven fabric is a long-fiber. The reason is that use of the long-fiber prevents the generation of fluff on a surface of the woven fabric, and improves impregnation of the hot melt resin of the sealing tape.

It is preferable to use a textured yarn as at least one of the warp and the weft constituting the woven fabric. The reason is that use of the textured yarn improves impregnation of the hot melt resin of the sealing tape. Further, appearance and touch feeling of the woven fabric is hardly impaired even when the woven fabric is reduced in its fiber density.

A weave of the woven fabric is preferably a plain weave construction, for example. The reason is that use of the woven fabric of the plain weave construction decreases a fiber density of the woven fabric easier, and improves impregnation of the hot melt resin of the sealing tape.

When a waterproof film is used as the flexible film, the resultant layered product can have a waterproof property, and when a waterproof and moisture-permeable film is used, the resultant layered product can have a waterproof and moisture-permeable property, for example.

The waterproof and moisture-permeable film is preferably a porous film consisting of a hydrophobic resin, for example, and more preferably a porous polytetrafluoroethylene film. The porous film containing a hydrophobic resin preferably has a hydrophilic resin layer at the side on which the woven fabric is layered. The hydrophilic resin layer formed on the porous film containing the hydrophobic resin is provided to prevent oil and dirt of the body from entering into pores of the porous film when the layered product of the present invention is processed into a garment or the like. If oil and dirt of the body enter into pores of the porous film, the porous film tends to reduce its waterproof property.

In the present invention, the flexible film preferably has an additional cloth laminated on the other side (a side opposite to the side on which the woven fabric is laminated). The reason is that by laminating the cloth on the other side, the resultant layered product has higher physical strength and design quality.

The present invention includes textile products prepared by using the layered product partially or wholly, in which the layered product is subject to the sealing treatment at the side on which the woven fabric is layered.

The present invention overcomes the practical restriction that a knit must be used on the side to be subjected to the sealing treatment.

According to the present invention, a layered product can be obtained, which facilitates the sealing treatment, has appearance and touch feeling intact, and is lightweight.

BEST MODE FOR CARRYING OUT THE INVENTION

Figure 1:
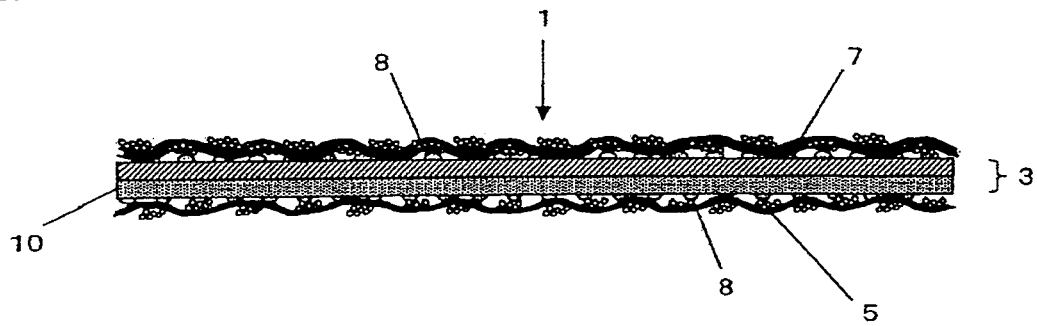
FIG. 1 is a cross-section view illustrating an example of the layered product of the present invention.

The present invention provides a layered product comprising a flexible film and a woven fabric laminated on the flexible film, in which the woven fabric is laminated on the side which is supposed to be subjected to the sealing treatment in processing the layered product into the textile product, and the woven fabric has a total cover factor ($CF_{total}$) of from 700 to 1400, calculated from cover factors of warp and weft constituting the woven fabric, according to the following formulae.

$$CF_{total} = CF_m + CF_t$$

$$CF_m = \sqrt{F_m} \times D_m$$

$$CF_t = \sqrt{F_t} \times D_t \quad \text{[formula 2]}$$

$CF_m$: cover factor of warps
$CF_t$: cover factor of wefts
$F_m$: fineness of warps (dtex)
$F_t$: fineness of wefts (dtex)
$D_m$: density of warps (counts/2.54 cm)
$D_t$: density of wefts (counts/2.54 cm)

First, the woven fabric used in the present invention that is laminated on the side to be subjected to the sealing treatment is described. In the woven fabric used in the present invention, the total cover factor ($CF_{total}$) calculated from cover factors of the warp and the weft constituting the woven fabric, according to the above formula, is not less than 700, more preferably not less than 800, and still more preferably not less than 900, and is not more than 1400, more preferably not more than 1300, and still more preferably not more than 1200. The cover factor as used herein is an indicator for roughness of the woven fabric. A larger cover factor means narrower spaces between the yarns, and a smaller cover factor means wider spaces between the yarns.

In the present invention, the total cover factor ($CF_{total}$) calculated from cover factors of the warp and the weft constituting the woven fabric, according to the above formula, is made not less than 700 in order to secure the strength of the woven fabric used, improve a handling property and processability and keep the minimum appearance and touch feeling which is necessary. When the total cover factor is less than 700, the layered product has an insufficient physical strength in practice, and impaired appearance and touch feeling. Appearance of the layered product depends on how an externally exposed side looks. When the total cover factor is less than 700, a to be seen through spaces between the yarns of the woven fabric is large, and the resultant textile product will not satisfy quality that is generally required. Touch feeling of the layered product is sensation (sense in the skin) generating when the body touches to the layered product. When the total cover factor is less than 700, the layered product produces rough sensation. On the other hand, in order to secure impregnation of the hot melt resin of the sealing tape, the woven fabric used in the present invention must be coarse in some degree. The total cover factor calculated by the above formula is therefore preferably not more than 1400. When the total cover factor is more than 1400, impregnation of the hot melt resin of the sealing tape is insufficient, which results in failure of securing a sealing performance at the sealing part, and the layered product has hard texture and becomes hard to be reduced in weight.

It is preferable that at least one of the cover factor of the warp ($CF_m$) and the cover factor of the weft ($CF_t$) is not less than 300, preferably not less than 400, and is not more than 800, preferably not more than 700. The strength and a handling property of the woven fabric, and impregnation of the hot melt resin of the sealing tape will be improved by setting at least one of the cover factors of the warp and the weft within the above range. The cover factors of the warp and the weft can be controlled by appropriately selecting fineness and density, as shown clearly in the formulas.

Finenesses of the warp and the weft constituting the woven fabric are preferably not less than 5 dtex, more preferably not less than 7 dtex, and are not more than 55 dtex, more preferably not more than 33 dtex. Fineness of not less than 5 dtex provides the resultant layered product with a physical strength, and an abrasion resistance at practical level can be obtained. By setting the fineness to not more than 55 dtex, the resultant layered product is reduced in weight and has soft texture, and impregnation of the hot melt resin of the sealing tape is improved.

At least one of the warp and the weft constituting the woven fabric is preferably made of two or more filaments. Use of the warp or the weft made of two or more filaments provides the resultant layered product with soft texture. Further, the filament constituting the warp and the weft preferably has a fineness per a filament of not more than 12 dtex. By setting a fineness per filament of the filament constituting the warp and the weft to not more than 12 dtex, the resultant layered product has softer texture.

Densities of the warp and of the weft constituting the woven fabric may be appropriately determined as the total cover factor falls within the range described above.

Fibers constituting the woven fabric (fibers constituting the warp or the weft) used in the present invention preferably exhibit heat resistance at a higher temperature than a softening point of the hot melt resin used in the sealing tape. Since the hot melt resin generally has a softening point of less than 140° C., preferably used are yarns having a softening point of not less than 140° C. and exhibiting heat resistance as not causing significant deformation at a lower temperature than 140° C. More preferably used are fibers having a softening point of not less than 170° C. and exhibiting heat resistance as not causing significant deformation at a lower temperature than 170° C.

The fibers may be a natural fiber or a synthetic fiber. Examples of the natural fiber include vegetable fibers such as cotton and hemp, and animal fibers such as silk, wool, and other animal hairs. Examples of the synthetic fiber include a polyamide fiber, a polyester fiber, and an acrylic fiber. In applications particularly as garments, from the points of flexibility, strength, durability, cost, lightweight properties, and the like, the polyamide fiber and the polyester fiber are preferable.

The fibers constituting the woven fabric used in the present invention may be a long-fiber or a short-fiber, but a long-fiber or a fiber substantially like a long-fiber is preferably used. If the short-fiber is used, the resultant layered product easily generates fluff on a surface thereof, impregnation of the hot melt resin of the sealing tape into the layered product is decreased, and thus the sealing effect may be lowered. Consequently, when the short-fiber is used, the fluff on the surface of the resultant layered product is preferably to be treated (removed) by a treatment such as singeing and fusing.

A type of the yarn is not specifically limited. However, in scouring, dying, and subsequent layering processes, after preparing a gray fabric, and in handling, when the warp and weft constituting a low density woven fabric are raw yarn, those easily generate texture gap to result impaired appearance and difficulty in production. The type of the yarn is therefore preferably a textured yarn, and more preferably a false-twist yarn. In addition, when a textured yarn is used, impregnation of the hot melt resin of the sealing tape is improved, compared to a raw yarn. This is because using a textured yarn provides a space between yarns has large irregularities, and thus an anchoring effect derived from impregnation of the hot melt resin of the sealing tape is increased.

The weave of the woven fabric is not specifically limited, and includes a twill weave, a satin weave, and a plain weave. Among them, preferred is a plain weave construction, and more preferred is a rip-stop construction. If the woven fabric is made of the plain weave construction, the woven fabric is easily reduced in fiber density, and impregnation of the hot melt resin of the sealing tape is improved. Further, when the weave of the woven fabric is a rip-stop construction, the woven fabric can easily achieve a required physical strength even at low fiber density, and can have high design quality.

Next, the flexible film used in the present invention is described.

The flexible film can be not specifically limited, as long as it has flexibility. Examples of the flexible film include films of a polyurethane resin, a polyester resin such as poly(ethylene terephthalate) and poly(butylene terephthalate), an acrylic resin, a polyolefin resin such as polyethylene and polyolefin, a polyamide resin, a vinyl chloride resin, synthetic rubber, natural rubber, and a fluorine-containing resin.

A thickness of the flexible film is preferably not less than 5 µm, more preferably not less than 10 µm, and is not more than 300 µm, more preferably not more than 100 µm. If the thickness of the flexible film is thinner than 5 µm, the flexible film has difficulty in handling in production, while if the thickness is over 300 µm, flexibility of the flexible film is impaired. The flexible film is measured with a dial-type thickness gauge (measured with a 1/1000 mm dial-type thickness gauge manufactured by TECLOCK and without applying a load except a spring body), and an average of the measurement is considered as the thickness of the flexile film.

The flexible film used is preferably a film having, for example, a waterproof, wind-proof, or dust-proof property. When a waterproof film is used as the flexible film, the resultant layered product can have a waterproof property. When a waterproof and moisture-permeable film is used, the resultant layered product can have a waterproof and moisture-permeable property. A film having a waterproof or waterproof and moisture-permeable property generally has also a wind-proof and a dust-proof properties.

In applications requiring particularly a waterproof property such as rainwear garments, a flexible film having a water-resistance (waterproof property) of not less than 100 cm, more preferably not less than 200 cm measured in accordance with JIS L 1092 A is preferably used.

In a preferred embodiment of the present invention, a waterproof and moisture-permeable film is used as the flexible film. The waterproof and moisture-permeable film means a film having both a "waterproof property" and a "moisture-permeable property". That is, the layered product of the present invention can have the "moisture-permeable property" as well as the "waterproof property". For example, when the layered product of the present invention is processed into a garment, the vapor of sweat from the body of a person wearing the garment is released to the outside through the layered product, and thus the person can be kept away from a humid feeling during wearing. As used herein, a "moisture-permeable property" is a property of allowing water vapor to permeate. The flexible film preferably has a moisture-permeable property of, for example, not less than 50 $g/m^2 \cdot h$, more preferably not less than 100 $g/m^2 \cdot h$ measured in accordance with JIS L 1099 B-2.

Examples of the waterproof and moisture-permeable film include films of hydrophilic resins such as of a polyurethane resin, a polyester resin, a silicone resin and a polyvinyl alcohol resin, and a porous film made of a hydrophobic resin (hereinafter, also referred simply to as a "hydrophobic porous film") such as polyester resin, a polyolefin resin (e.g., polyethylene, polypropylene), a fluorine-containing resin, and a polyurethane resin modified by a water repellent treatment. As used herein, the "hydrophobic resin" means a resin having a contact angle of a water drop of not less than 60 degrees (measured at 25° C.), more preferable not less than 80 degrees when the resin is formed into a smooth flat plane and a water drop is put thereon.

In the hydrophobic porous film, a porous structure having pores (open cells) inside keeps the moisture-permeable property, and the hydrophobic resin constituting the film base material prevents water from entering the pores to exhibit the waterproof property in the film entirety. Among porous films, preferred for the waterproof and moisture-permeable film is a porous film made of a fluorine-constituting resin, and more preferred is a porous polytetrafluoroethylene film (hereinafter, also referred to as a "porous PTFE film"). Since polytetrafluoroethylene that is a resin component constituting a film base material has high hydrophobicity (water repellent), particularly the porous PTFE films can have both of excellent waterproof and moisture-permeable properties.

The porous PTFE film is obtained by mixing a fine powder of polytetrafluoroethylene (PTFE) with a molding auxiliary agent to give a molded body of a paste, removing the molding auxiliary agent from the molded body, and then expanding a product into a plane at high temperature and high speed, and thus has a porous structure. In other words, the porous PTFE film is constructed with nodes interconnected by fine crystal ribbons, which the node is an aggregate of primary particles of polytetrafluoroethylene, and fibrils, which are bundles of crystal ribbons fully expanded from the primary particles. A space defined by fibrils and nodes connecting the fibrils is a pore in the film. A porosity, a maximum pore diameter, and the like of the porous PTFE film described below can be controlled by controlling an expanding ratio and the like.

The maximum pore diameter of the hydrophobic porous film is preferably not less than 0.01 µm, more preferably not less than 0.1 µm, and is not more than 10 µm, more preferably not more than 1 µm. When the maximum pore diameter is smaller than 0.01 µm, production of the film is difficult. When larger than 10 µm, the hydrophobic porous film has a reduced waterproof property and film strength, which result in difficulty of handling of the film in subsequent steps such as layering.

The porosity of the hydrophobic porous film is preferably not less than 50%, more preferably not less than 60%, and is preferably not more than 98%, more preferably not more than 95%. By setting the porosity of the hydrophobic porous film to not less than 50%, the film can ensure a moisture-permeable property, and by setting to not more than 98%, the film can ensure its strength.

A value of the maximum pore diameter is measured in accordance with the requirement of ASTM F-316. The porosity is calculated from an apparent density (ρ) measured in accordance with the measuring method of apparent density specified in JIS K 6885, by the following formula.

porosity (%)=(2.2−ρ)/2.2×100

A thickness of the hydrophobic porous film is preferably not less than 5 µm, more preferably not less than 10 µm, and is preferably not more than 300 µm, more preferably not more than 100 µm. When the thickness of the hydrophobic porous film is thinner than 5 µm, the film has difficulty in its handling in production, and when thicker is than 300 µm, the hydrophobic porous film has an impaired softness and a reduced moisture-permeable property. The hydrophobic porous film is measured with a dial-type thickness gauge (measured with a 1/1000 mm dial-type thickness gauge manufactured by TECLOCK and without applying a load except a spring body), and an average of the measurement is considered as the thickness of the hydrophobic porous film The hydrophobic porous film preferably has pores of which inside surfaces are coated with a water repellent and an oil repellant polymers for use. By coating the inside surfaces of the pores of the hydrophobic porous film with a water repellent and an oil repellant polymers, various contamination such as skin oil, machine oil, beverages, and laundry detergents are prevented from penetrating into or being held in the pores of the hydrophobic porous film. Those contaminations cause decline of hydrophobicity of PTFE preferably used in the hydrophobic porous film to result in an impaired waterproof property.

In this case, as the polymer, a polymer having a fluorine-containing side chain can be used. Details of the polymer and a method for combining it into the porous film are disclosed in, for example, WO 94/22928.

An example of the coating polymer is shown below.

As the coating polymer, preferably used is a polymer having a fluorine-containing side chain (a fluorinated alkyl moiety preferably has 4 to 16 carbon atoms) obtained by polymerization of fluoroalkyl acrylate and/or fluoroalkyl methacrylate represented by the following chemical formula (1)

[Chemical formula 1]

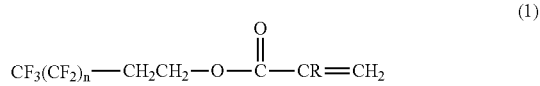

(1)

(wherein, n is an integer from 3 to 13, R is hydrogen or a methyl group).

A method of coating the inside of the pores of the porous film with the above polymer comprises preparing an aqueous micro emulsion of the polymer (average particle diameter: 0.01 to 0.5 µm) with a fluorine-containing surfactant (e.g., ammonium perfluorooctanate), impregnating the pores of the porous film with the micro emulsion, and heating. By heating, water and the fluorine-containing surfactant are removed off, and the polymer having a fluorine-containing side chain is melted to coat the inside surface of the pores of the porous film while maintains open cells as they are, and thus the hydrophobic porous film excellent in water and oil repellent properties can be obtained.

Other polymers can be used for the coating polymer, including "AF polymer" (trade name, DuPont), "CYTOP" (trade name, Asahi Glass Co. Ltd.), and the like. Coating the inside surface of the pores of the porous film with those polymers may be conducted by dissolving the polymers in an inactive solvent such as "Fluorinert" (trade name, Sumitomo 3M Limited), impregnating the porous PTFE film with the solution, and removing the solvent by evaporation.

In the present invention, the hydrophobic porous film preferably has a hydrophilic resin layer at the side on which the woven fabric is layered. An embodiment using the hydrophilic resin layer is useful particularly in the case of processing the layered product of the present invention into garments for which the woven fabric is used on the inner side. That is, the hydrophilic resin absorbs moisture such as sweat generated from the human body and releases it to the outside, and prevents various contaminations such as skin oil and cosmetic oil from invading into the pores of the hydrophobic porous film from the body side. As described above, those contaminations cause decline of hydrophobicity of PTFE preferably used in the hydrophobic porous film to result in an impaired waterproof property. In addition, the formation of the hydrophilic resin layer also increases mechanical strength of the hydrophobic porous film, and thus the hydrophobic porous film having more excellent durability can be obtained. The hydrophilic resin layer may be formed on the surface of the hydrophobic porous film, but a surface portion of the hydrophobic porous film is preferably impregnated with the hydrophilic resin. The penetration of the hydrophilic resin layer into the pores of the hydrophobic porous film provides an anchoring effect, which result in higher bonding strength between the hydrophilic resin layer and the hydrophobic porous film. It is noted that the film has a reduced moisture-permeable property if the hydrophobic porous film is impregnated with the hydrophilic resin layer over the whole thickness direction thereof.

As the hydrophilic resin, preferably used is a polymer material having a hydrophilic group such as a hydroxyl group, a carboxyl group, a sulfonic acid group, and an amino acid group, having water swelling properties, and are water-insoluble. Specific examples include hydrophilic polymers such as polyvinyl alcohol, cellulose acetate, cellulose nitrate, and hydrophilic polyurethane resins, at least a part of which is crosslinked. In view of the heat-resistance, chemical-resistance, processability, moisture-permeable property, and the like, the hydrophilic polyurethane resin is particularly preferred.

As the hydrophilic polyurethane resin, preferably used is a polyester- or polyether-based polyurethane or a prepolymer having a hydrophilic group such as a hydroxyl group, an amino group, a carboxyl group, a sulfonic acid group, and an oxyethylene group. To adjust a melting point (softening point) of the resin, diisocyanates and triisocyanates having two or more isocyanate groups, and adducts thereof can be used alone or in combination as a cross-linking agent. For prepolymers having an isocyanate terminal, polyols having bi- or multi-functionality such as diols and triols, and polyamines having bi- or multi-functionality such as diamines and triamines can be used as a curing agent. To keep a moisture-permeable property high, bifunctional is more preferred than trifunctional.

A method of forming the hydrophilic resin layer such as the hydrophilic polyurethane resin on the surface of the hydrophobic porous film comprises preparing a coating liquid by dissolving the (poly)urethane resin in a solvent or by heating the (poly)urethane resin to melt, and applying the coating liquid to the hydrophobic porous film with, for example, a roll coater. A viscosity of the coating liquid suitable for making the hydrophilic resin penetrating into the surface portion of the hydrophobic porous film is not more than 20,000 cps (mPa·s), and more preferably not more than 10,000 cps (mPa·s) at an applying temperature. In the case of preparing a solution with a solvent, when the viscosity is too low, although depending on a composition of the solvent, the applied solution spreads over the hydrophobic porous film to cause hydrophilization of the whole hydrophobic porous film, and a uniform resin layer may not be formed on the surface of the hydrophobic porous film, which increases probability of defect in waterproof property. Therefore, the viscosity is thus preferably kept not less than 500 cps (mPa·s). The viscosity can be measured with a B type viscometer of Toki Sangyo Co. Ltd.

In another preferred embodiment, the layered product of the present invention has the woven fabric layered on the side to be subjected to the sealing treatment in processing the layered product into a textile product, and further has a cloth layered on the other side. If the cloth is laminated on the other side, the resultant layered product has higher physical strength and design quality. Although the layered product of the present invention has the woven fabric layered on the side to be subjected to the sealing treatment in processing the layered product into a textile product, and further has a cloth layered on the other side, either of the sides of the layered product can be used, without limitation, as the face side or the inner side of the garment. In a typical embodiment, the side subjected to the sealing treatment on which the woven fabric is layered is the inner fabric, and the other side on which the cloth is layered is the face fabric. In particular, in the case of processing the layered product of the present invention into garments, if the side subjected to the sealing treatment is the inner side, the resultant garments have improved appearance.

Examples of the cloth include, not specifically limited, woven fabrics, knitted fabrics, nets, nonwoven fabrics, felts, synthetic and natural leathers, and the like. Examples of a material constituting the cloth include natural fibers such as cotton, hemp, and animal hairs, synthetic fibers, metal fibers, ceramic fibers and the like. The material may be appropriately selected according to an application in which the layered product is used. For example, when the layered product of the present invention is used in outdoor products, from the points of ductility, strength, durability, cost, lightweight, and the like, woven fabrics made of polyamide fibers, polyester fibers, and the like are preferably used. The cloth may be subjected to conventionally known treatments such as water repelling, softening, and an antistatic treatment where necessary.

Next, a method for producing the layered product of the present invention is described.

In the present invention, in laminating the flexible film with the woven fabric or the cloth, conventionally known adhesives can be used. Those adhesives include thermoplastic resin adhesives and resin adhesives curable by heat, light, or a reaction with water. Examples of the resin adhesive include a polyester resin, a polyamide resin, a polyurethane resin, a silicone resin, a (meth)acrylic resin, a poly(vinyl chloride) resin, a polyolefin resin, a polybutadiene rubber, and other rubbers. Among them, preferred is a polyurethane resin adhesive. Among polyurethane resin adhesives, particularly preferred is a curing reaction type hot-melt adhesive.

The curing reaction type hot-melt adhesive is an adhesive, which is in a solid state at an ambient temperature, turns into a liquid of low viscosity by heating to melt. The curing reaction type hot-melt adhesive becomes a liquid of higher viscosity or a solid by a curing reaction which occurs by making it held in heated state, heated to higher temperature, or in contact with water or other multi-functional compounds having an active hydrogen. The curing reaction can be accelerated by the presence of a curing catalyst and a curing agent.

The curing reaction type polyurethane resin hot-melt adhesive used for adhering the flexible film with the woven fabric or the cloth preferably has a viscosity of, for example, 500 to 30,000 mPa·s (more preferably not more than 3,000 mPa·s) in the state of liquid of low viscosity by heating to melt. As used herein, the viscosity is a value measured using an "ICI Cone and Plate Viscometer" manufactured by Research Equipment with a corn-type rotor at 125° C. As the curing reaction type polyurethane resin hot-melt adhesive, a conventionally known urethane prepolymer capable of the curing reaction with moisture (water) is preferable. The urethane prepolymer can be obtained by an addition reaction of a polyol such as a polyester polyol and a polyether polyol with an aliphatic or aromatic polyisocyanate such as TDI (toluene diisocyanate), MDI (diphenylmethane diisocyanate), XDI (xylylene diisocyanate), and IPDI (isophorone diisocyanate) such that an isocyanate group is remaining at the terminal. The resultant urethane prepolymer allows the curing reaction with moisture in the air due to the presence of the isocyanate group at the terminal. In the urethane prepolymer, a melting temperature is not less than 50° C., which is slightly higher than a room temperature, and more preferably from 80 to 150° C.

Examples of the urethane prepolymer include "Bondmaster" commercially available from Nippon NSC Ltd. The urethane prepolymer turns into melt having a viscosity applicable to the woven fabric or the cloth by heating to 70 to 150° C. The melt is used to adhere the woven fabric or the cloth to the flexible film, and then cooled to around a room temperature to cure into the semi-solid state, in which state the prepolymer is prevented from excess permeation and diffusion into the fabric and the like. Then the curing reaction goes on with moisture in the air to result in soft and strong adhesion.

A method for applying the adhesive is not specifically limited, and may be any known method such as rolling, spraying, and brush-painting. In the case of imparting a moisture-permeable property to a cloth to be layered, it is recommended that the adhesive is applied as dots or lines. An adhesion area (application area of the adhesive) is preferably 5 to 95%, and more preferably 15 to 50% of the total area of the layering layer. An applied amount of the adhesive may be determined in consideration with roughness of the surface of the fabric, fiber density, required adhesion, durability and the like. The applied amount is preferably 2 to 50 g/m², and more preferably 5 to 20 g/m². If the applied amount of adhesive is too low, the adhesion is insufficient, and for example, durability enough to withstand to washing cannot be achieved. On the other hand, if the applied amount of adhesive is too much, the resultant layered product may have a hard texture, which is unfavorable.

An example of a preferred laminating method is a method comprising applying melt of the curing reaction type polyurethane resin adhesive to the flexible film with a roll having a gravure pattern or spraying the melt on the flexible film, layering the woven fabric or the cloth thereon, and press-bonding with a roll. Particularly when the method of applying with a roll having a gravure pattern is employed, a good adhesion is secured, the resultant layered product has good texture, and a yield is good.

The layered product of the present invention can be processed into a textile product by using it as a part or the whole of the product. For example, when the layered product of the present invention is processed into a textile product by using it as the whole product, the layered product of the present invention is cut into pieces of desired shapes and sizes, and the pieces are sewed or fused to produce a textile product. When the layered product of the present invention is processed into a textile product by using it as a part thereof, the textile product is similarly produced by using the layered product of the present invention in combination with a conventional fabric and the like.

Sewing of the layered product can be conducted with a sewing machine, and the like. A sewing yarn used in sewing may be any material of cotton, silk, hemp, polynosic, a polyamide resin, a polyester resin, a vinylon resin, a polyurethane resin, or the like or a mixture thereof. From the points of strength, heat-resistance, and the like, a polyamide resin or a polyester resin is preferably used. A size of the sewing yarn may be appropriately adjusted according to a thickness of the layered product to be sewed and a strength required for a product. For instance, yarns of 40 to 70 counts are preferably used, when sewing a three-layer layered product where a expanded porous PTFE film is laminated on one side of the cloth (78 dtex nylon taffeta) with an adhesive, and a woven fabric (22 dtex nylon taffeta, total cover factor of warp and weft: 700 to 1400) is laminated with an adhesive with a sewing yarn made of polyester resin.

A method of sewing is not specifically limited if the method uses a single or multiple yarns for sewing. Examples of a stitch shape include a linear, a curved, and a zigzag stitches sewed appropriately using lock stitches, single chain stitches, double chain stitches, and the like.

Examples of a method for fusing the layered product include methods of direct fusing of pieces of the layered product cut into desired shapes and sizes by thermal press-bonding, indirect fusing of the pieces using a sheet of a hot melt resin (hereinafter, also referred simply to as a "hot melt sheet"), and the like.

Examples of the hot melt sheet include a "Gore-seam Sheet Adhesive" manufactured by Japan Gore-Tex. The hot melt resin used in the hot melt sheet can be same resin used in a hot melt resin layer of a sealing tape described below. Conditions for fusing the layered product with the hot melt sheet can be the same conditions for press-bonding the sealing tape.

A part of the sewed or fused portion is subjected to the sealing treatment. Subjecting to the sealing treatment enhances sealing properties such as waterproof, dust-proof, and wind-proof properties and strength of the resultant textile product. A method for filling is not specifically limited as long as the method can secure desired properties such as a waterproof, a dust-proof, or a wind-proof property in the sewed or fused portion.

For example, when the layered product of the present invention is processed into a textile product by sewing, a method of sealing pinholes with a resin is preferred, because a high waterproof property can be achieved. Examples of the method of sealing pinholes with a resin include applying a resin on the sewed portion, and adhering or fusing a tape-shaped resin (a sealing tape) together. A method using the sealing tape is more preferred, because the sealed portion has better waterproof property and durability. When the layered product of the present invention is processed into a textile product by fusing, the textile product might have lower strength. Thus, subjecting the fused portion to the sealing treatment with the sealing tape and the like, the resultant textile product has an increased strength.

In the present invention, as the sealing tape for subjecting the sewed or fused portion to the sealing treatment, appropriately used are tapes prepared by laminating an adhesion resin having a low melting point on the back side (facing to the sewed portion) of a tape substrate of a resin having a high melting point, and the like. Preferred examples include a sealing tape containing a tape substrate and a hot melt resin layer provided on the back side. The face side (externally exposed side) of the tape substrate may be processed by laminating a knit, mesh, or the like thereon. Examples of the sealing tape appropriately used include sealing tapes containing a polyurethane resin film as a tape substrate and a polyurethane hot melt resin as an adhesion resin such as "T-2000" and "FU-700" manufactured by Sun Chemical Corporation, sealing tapes such as "MF-12T2" and "MF-10F" manufactured by Nisshinbo Industries, Inc., "GORE-SEAM TAPEs" containing a porous PTFE film as a tape substrate and a polyurethane hot melt resin as an adhesion resin manufactured by Japan Gore-Tex, Inc.

Examples of the hot melt resin of the sealing tape include a polyethylene resin or a copolymer resin thereof, a polyamide resin, a polyester resin, a butyral resin, a polyvinyl acetate resin and a copolymer resin thereof, a cellulose derivative resin, a polymethylmethacrylate resin, a polyvinyl ether resin, a polyurethane resin, a polycarbonate resin, a poly (vinyl chloride) resin. Those resins may be appropriately used alone or in combination of at least two of them. When the sealing tape is used in garments, the polyurethane resin is preferred. This is because dry cleaning durability, washing durability, and a soft texture are required in the case that the layered product is used for garments. A thickness of the hot melt resin layer of the sealing tape is preferably not less than 25 μm, more preferably not less than 50 μm, and is preferably not more than 400 μm, and more preferably not more than 200 μm. If the hot melt resin layer has a thickness of less than 25 μm, the amount of the resin is not enough to completely seal irregularities of pinholes, which can result a sewed portion having insufficient waterproof property. On the other hand, if the hot melt resin layer has a thickness of more than 400 μm, in thermal press bonding the tape, it takes time to fully melt the resin, which can result in reduced productivity and thermal damage on the flexible film to be adhered, or in an attempt to shorten the time of thermal press bonding, the hot melt resin layer insufficiently melts and cannot result in sufficient adhesion strength and waterproof property. In addition, a texture of a sealed portion after adhesion is hard, and when the layered product of the present invention is used in a garment, for example, the garment has rough feeling at the sealed portion.

Those sealing tapes can be fused by a conventional hot air sealer, which fuses a sealing tape by blowing the hot air to the side of the hot melt resin layer of the tape to melt the resin and press bonding it to the adherend with a pressure roll. For example, "QHP-805" manufactured by Queen Light Electronic Industries Limited, "5000E" manufactured by W. L. Gore &Associates, Inc., and the like can be used. To fuse a short sewed portion easier, the sealing tape may be thermally press bonded with a hot press and an iron available in the marketplace. In this case, heat and pressure is applied to the sealing tape in the state of being laminated on the sewed portion.

Conditions of thermal press bonding of the sealing tape may be appropriately determined, depending upon a softening point of a hot melt resin used in the tape, thickness of the flexible film, material, fusing speed, and the like. An example of thermal press bonding of the sealing tape is as follows. When three-layer layered products comprising a fabric (78 dtex nylon taffeta), a porous PTFE film laminated on the fabric, and a woven fabric (22 dtex nylon taffeta, total cover factor of the warp and the weft: 700 to 1400) laminated on the other side of the fabric, are thermally press bonded each other at the side of 22 dtex nylon taffeta using the sealing tape ("5000E" manufactured by W. L. Gore & Associates, Inc.), the sealing tape is mounted on the hot air sealer and thermally press bonded at a condition that a surface temperature of the hot melt resin is from 150° C. to 180° C., and is more preferably 160° C. Then, a heated portion is allowed to stand to cool to room temperature, and thereby the thermal press bonding is completed. In this case, as the hot melt resin, a polyester type urethane resin is preferably used.

A flow rate of the hot melt resin (measured at 180° C. using a flow tester "CFT-500" manufactured by Shimadzu Corporation) is preferably within the range from 40 to $200 \times 10^{-3}$ cm$^3$/s, and more preferably within the range from 60 to $100 \times 10^{-3}$ cm$^3$/s. If the flow rate of the hot melt resin is too low, the adhesion is insufficient, and if the flow rate is too high, the hot melt resin leaks from pinholes and from edge parts of the tape and adheres to the press roll and the like. If the surface temperature of the hot melt resin is low, the resin melts insufficiently and results in insufficient adhesion strength and waterproof property. If the surface temperature of the hot melt resin is high, the resin has excessively high flowability and causes the leaking problem at the sewed portion, and the thermal decomposition of the resin in itself occurs, and the adhesion strength and a waterproof property may be lowered.

As described above, the layered product of the present invention is processed into textile products such as clothes, sheets, tents, bags, and sleeping bags.

Below, the present invention will be described in reference with the drawings, but should not be limited to embodiments shown in the drawings. FIG. 1 is a cross-section view schematically showing the layered product of the present invention. The layered product 1 shown in FIG. 1 is an embodiment using a porous film consisting of a hydrophobic resin as a flexible film 3. A woven fabric 5 having a total cover factor of the warp and weft from 700 to 1400 is laminated on the side of the layered product, which side is supposed to be subjected to the sealing treatment in processing the layered product 1 into a textile product. A cloth 7 is laminated on the other side of the layered product 1. The woven fabric 5 and the cloth 7 are adhered to the flexible film 3 with a hot melt resin adhesive 8. A hydrophilic resin layer 10 is formed in the porous film consisting of the hydrophobic resin at the side on which the woven fabric 5 is laminated.

Figure 2:
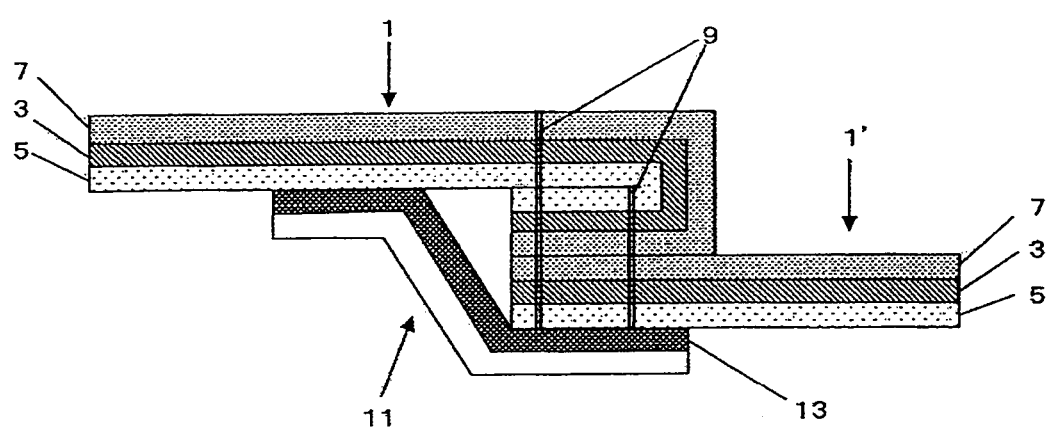
FIG. 2 is a schematic cross-section view of a part of the layered product of the present invention at which the layered product is sewed and subjected to the sealing treatment.
Figure 3:
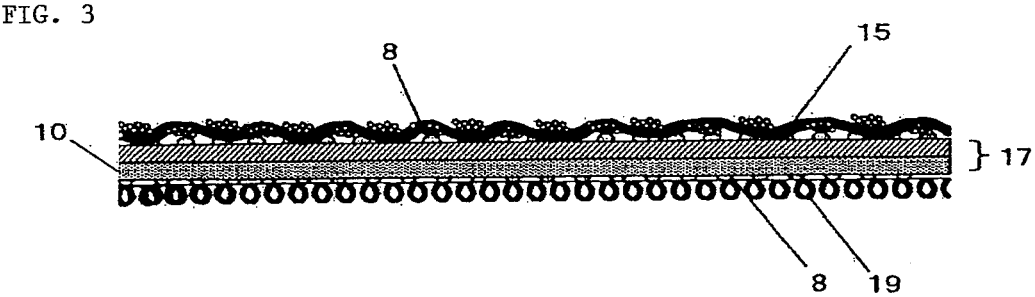
FIG. 3 is a cross-section view illustrating a conventional layered product.
Figure 4:
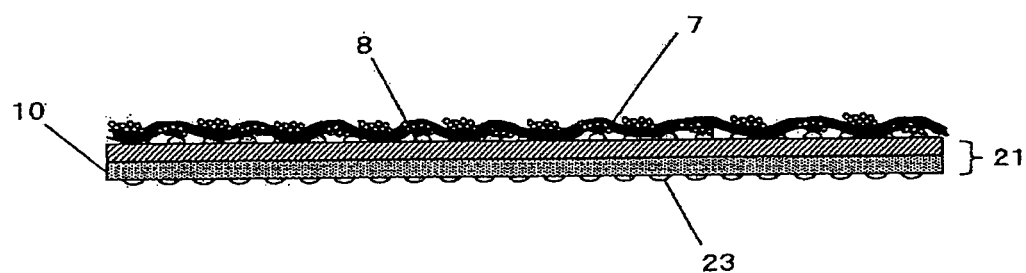
FIG. 4 is a cross-section view illustrating a conventional layered product.

FIG. 2 is a cross-section view schematically showing a sewed portion of the layered product of the present invention which is subjected to the sealing treatment with a sealing tape having a hot melt resin layer after sewing. The layered product 1 comprises the flexible film 3, the woven fabric 5 having a total cover factor of the warp and the weft of 700 to 1400 is laminated on the side of the layered product, which side is supposed to be subjected to the sealing treatment in processing the layered product 1 into a textile product, and the cloth 7 is laminated on the other side of the layered product 1.

The layered product 1 is folded back at an edge. A folded part is mounted on an edge of other layered product 1', and sewed thereto with a sewing yarn 9. A sealing tape 11 is adhered so as to cover the sewed portion. A part of the hot melt resin layer 13 penetrates into a surface portion of the woven fabric 5 mounted on the layered product 1 (not shown).

EXAMPLES

[Evaluation Methods]
1. Measurement of Fineness

Finenesses (dtex) of the warp and the weft of a woven fabric were measured in accordance with JIS L 1096. Finenesses of filaments constituting the warp and the weft are calculated by dividing the finenesses of the warp and the weft by respective numbers of filaments constituting the warp and the weft.

2. Measurement of Density

Densities (counts/2.54 cm) of the warp and the weft of the woven fabric were measured in accordance with JIS L 1096.

3. Thickness

A thickness of a test piece was measured in accordance with JIS L 1096. In the measurement, a dial-type thickness gauge "PF-15" manufactured by TECLOCK was used.

4. Weight Per Unit Area

A weight per unit area (g/m$^2$) of a test piece was measured in accordance with JIS L 1096.

5. Moisture-Permeable Property

A moisture-permeable property (g/m$^2 \cdot$h) of a test piece was measured in accordance with JIS L 1096 B.

6. Tear Strength

Tear strength (N) of a test piece was measured in accordance with JIS L 1096 D (pendulum method).

7. Tensile Strength

A tensile strength (N/5 cm) of a test piece was measured in accordance with JIS L1096 A, Labeled Strip Method (test piece width: 5 cm, clamping interval: 20 cm, pulling rate: 20 cm/min).

8. Velcro Abrasion Resistance

A hook part of a surface fastener ("Quicklon 1 QN-N20" manufacture by YKK Corporation) was attached to a frictional part having a shape of the friction tester II described in JIS L 0849. A test piece was mounted on a table for test piece. The surface fastener was attached to the frictional part such that a hook side faced to the test piece. The test piece was mounted on the table for test piece such that a side to be subjected to the sealing treatment of the layered product was the upper side (facing to the frictional part). In this situation, the test piece was rubbed 100 times with the frictional part applied with a load of 2 N, and observed for a state of a part rubbed of the test piece. A test piece having some damage was considered as defective, and a test piece found to have no damage was considered as non-defective.

9. Dehydration

A test piece was prepared by cutting a layered product into a circular form having a diameter of 140 mm with a rotating cutter ("RC-14", manufactured by Daiei Kagaku Seiki Mfg. Co., Ltd). The test piece was measured for weight to the unit of mg with an electronic balance ("FA200", manufactured by A&D Company, Ltd.), and immersed in ion-exchanged water for one minute. Then, the test piece was dewatered with a discharging and dewatering apparatus (Daiei Kagaku Seiki Mfg. Co., Ltd) at the conditions of a rotation number of 1000 rpm and a rotation time of 10 seconds, and immediately weighed similarly with the electronic balance. A difference (increased weight) of measured weights of the test piece between after dewatering and before immersion was calculated. The increased weight was divided by the surface area of the test piece (0.0154 square meters) to calculate an added water amount per unit area (unit: g/m$^2$) after dewatering, which amount was considered as dehydration.

10. Water Resistance of Sealed Portion

Preparation of a Test Piece of a Sealed Portion

The layered product produced was cut into 30 cm square, and then cut along a crisscross line passing through the center of the square to produce four square test pieces of the same size. Those were sewed together so as to restore the original form to produce a test piece having a crisscross seam at the center thereof. The test piece was sewed as shown in FIG. 2, in which a width of margin to the seam was 7 mm, the margin to the seam was folded back, and sewed by double stitching along the edge of the seam. As a sewing yarn, a polyester sewing yarn (50 counts) was used. The test piece was subjected to the sealing treatment with a sealing tape (Gore-seam Tape manufactured by Japan Gore-Tex, a resin flow value at 180° C.: 100×10$^{-3}$ cm$^3$/sec, respective resin thicknesses: 100 µm and 150 µm, width of both resins: 22 mm) by using a hot air sealer ("5000E" manufactured by W. L. Gore & Associates, Inc.) at the conditions of set temperature 700° C. and processing velocity 4 m/min.

A water resistance test for a sealed portion was conducted on the test piece at the initial state and after washed 20 times, using a water resistance testing device ("Schopper-type Water Resistance Tester WR-DM" manufactured by Daiei Kagaku Seiki Mfg. Co., Ltd) described in JIS L 1096 (low water pressure method). The test piece was applied with a water pressure of 20 kPa at the sealed portion from the side subjected to the sealing treatment for 1 minute, and then evaluated. When water appeared on the surface of the test piece opposite to the side to which the water pressure was applied, it was judged as defective, when absolutely not appeared, it was judged as non-defective.

Washing was conducted using a household fully automatic washing machine ("NA-F70PX1" manufactured by Matsushita Electric Industrial Co.), and followed by hang-drying for 24 hours at room temperature, which steps constituted a cycle. A test piece subjected to the cycle 20 times was used in the water resistance test after washed 20 times. In washing, a 35 cm×35 cm load cloth (a cotton shirting in accordance with JIS L 1096 that had been sewed and mended at the periphery) was added so that the total amount of the test piece and the load cloth was 300 g±30 g. Washing was conducted for 6 minutes using 40 liters of tap water and 30 g of detergent ("Attack" available from Kao Corporation), followed by rinsing twice and dewatering for 3 minutes.

11. Friction Coefficient

Static and dynamic friction coefficients between same test pieces (layered products) at sides each on which the woven fabric was laminated were measured according to ASTM D 1894-99 using a surface property tester "Tribo Gear Type 14DR" made by SHINTO SCIENTIFIC Co., Ltd. as the measuring device. Measurement was performed between the warp directions and between the warp and the weft directions of the woven fabric side, and average values thereof were used as static and dynamic friction coefficients of the woven fabric laminated in the layered product at the side to be subjected to the sealing treatment.

[Preparation of Layered Product]

Layered Product 1

As the flexible waterproof and moisture-permeable film, a porous PTFE film having a weight per unit area of 33 g/m$^2$ (Japan Gore-Tex, porosity: 80%, maximum pore diameter: 0.2 µm, average thickness: 30 µm) was used. As the woven fabric laminated on the side to be subjected to the sealing treatment when the layered product is processed into a textile product, a woven fabric A of nylon plain weave construction having a total cover factor of the warp and the weft of 1117 (fineness of both the warp and the weft: 17 dtex, the number of filaments of both the warp and the weft: five, density of the warp: 138 counts/2.54 cm, density of the weft: 133 counts/2.54 cm, weight per unit area: 19 g/m$^2$) was used. As the cloth laminated on the other side, a woven fabric B of nylon plain weave construction (fineness of both the warp and the weft: 17 dtex, density of the warp: 165 counts/2.54 cm, density of the weft: 194 counts/2.54 cm, weight per unit area: 27 g/m$^2$) was used.

As the hydrophilic resin applied to the porous PTFE film, a coating liquid of a polyurethane prepolymer was prepared by adding ethylene glycol to a hydrophilic polyurethane resin ("Hypol 2000" manufactured by Dow Chemical Corporation) at a NCO/OH equivalent ratio of 1/0.9 and mixing by stirring.

The coating liquid of the polyurethane prepolymer was applied to one side of the porous PTFE film (partially penetrated into a surface portion of the film) with a roll coater. In this time, an amount applied was 10 g/m$^2$. Then, the film was placed in an oven set to a temperature 80° C. and a humidity 80% RH for an hour to cure by reacting with moisture, and the hydrophilic polyurethane resin layer was formed on the side of the porous PTFE film. On the side of the porous PTFE film having the hydrophilic polyurethane resin layer formed thereon, the woven fabric A was laminated, and the woven fabric B was laminated on the other side.

For adhering the woven fabrics A and B to the porous PTFE film, a urethane-based moisture curing type hot-melt adhesive ("Hibon 4811" manufactured by Hitachi Kasei Polymer Co., Ltd.) was used. A temperature of the adhesive was set to 120° C. Melt of the adhesive was applied to the porous PTFE film in a spotted pattern with a gravure roll having a covering rate of 40% such that an amount of adhesive transferred was 5 g/m$^2$. Then, the woven fabrics A and B and the porous PTFE film were press bonded with a roll, and allowed to stand in a constant-temperature and constant-humidity chamber of 60° C. and 80% RH for 24 hours to cure the curing type hot-melt adhesive, and a three-layer layered product was obtained.

Figure 5:
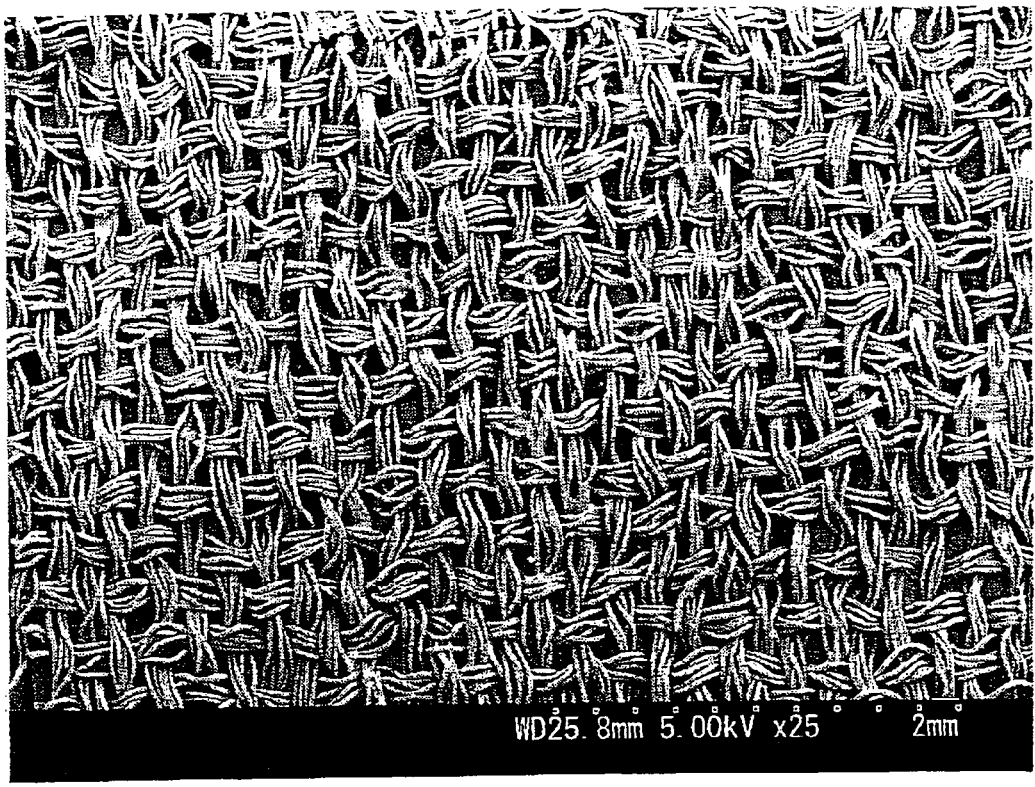
FIG. 5 is an electron micrograph of the side subjected to the sealing treatment of a layered product 1.

Next, the woven fabric B in the three-layer layered product was subjected to a water repellent treatment. A dispersion liquid was prepared by mixing 3% by mass of a water repellent ("Asahi Guard AG7000" manufactured by Meisei Chemical Works, Ltd.) and 97% by mass of water, and applied to a surface of the woven fabric B in an amount of more than saturation amount with a kiss coater. The excess dispersion liquid was removed by pressing with a mangle roll. In this time, an amount of the dispersion liquid absorbed in the woven fabric B was about 20 g/m$^2$. The layered product was then dried in a hot-air circulation type oven at the conditions of 130° C. and 30 seconds to give a three-layer layered product 1 subjected to the water repellent treatment. FIG. 5 shows an electron micrograph of the woven fabric laminated on the side subjected to the sealing treatment of the layered product 1 (magnification: 25).

Layered Product 2

A three-layer layered product 2 was obtained at the same conditions as in the layered product 1, except that a woven fabric C of nylon plain weave construction (fineness of both the warp and the weft: 78 dtex, density of the warp: 120 counts/2.54 cm, density of the weft: 90 counts/2.54 cm, weight per unit area: 66 g/m$^2$) was used instead of the woven fabric B in the layered product 1. An amount of the water repellent dispersion liquid applied was 25 g/m$^2$.

Layered Product 3

A three-layer layered product 3 was obtained by a process at the same conditions as in the layered product 1, except that a woven fabric D of nylon plain weave construction having a total cover factor of the warp and the weft of 1275 (fineness of both the warp and the weft: 33 dtex, the number of filaments of the warp: six, the number of filaments of the weft: ten, density of the warp: 121 counts/2.54 cm, density of the weft: 101 counts/2.54 cm, weight per unit area: 25 g/m$^2$) was used instead of the woven fabric laminated on the side to be subjected to the sealing treatment in the layered product 1.

Layered Product 4

The woven fabric C of nylon plain weave construction was subjected to a water repellent treatment. The water repellent treatment is performed to prevent the polyurethane resin solution described below from penetrating through the fabric when the solution is applied to the fabric. A dispersion liquid was prepared by mixing 1% by mass of a water repellent ("DIC Guard F-18" manufactured by Dainippon Ink and Chemicals Incorporated) and 99% by mass of water, and applied to the surface of the woven fabric C in an amount of more than saturation amount with a kiss coater. The excess dispersion liquid was removed by pressing with a mangle roll. In this time, an amount of dispersion liquid applied was about 25 g/m$^2$. The fabric was then dried in a hot-air circulation type oven at the conditions of 130° C. and 30 seconds.

To one side of the woven fabric C after the water repellent treatment, the polyurethane resin solution having the composition listed in Table 1 was applied with a knife over roll coater such that an applied amount was 200 g/m$^2$. The woven fabric C after application was immersed in a coagulation bath filled with an aqueous solution of 10% by mass of N,N-dimethylformamide for five minutes at 30° C. to cause wet coagulation of the polyurethane resin. The fabric was then washed in a warm water of 60° C. for 10 minutes, and dried with a hot air at 140° C. to form a porous polyurethane layer on the side of the woven fabric C after the water repellent treatment.

Next, on the other surface of the porous polyurethane layer (corresponding to the side to be subjected to the sealing treatment when the layered product is processed into a textile product), the woven fabric A of nylon plain weave construction was laminated similarly as in the layered product 1 to give a three-layer layered product 4.

TABLE 1

| Ingredient | Content (part by mass) |
|---|---|
| Polyester-based polyurethane resin solution "Crisvon MP-829" manufactured by Dainippon Ink and Chemicals Incorporated | 50 |
| Polyester-based polyurethane resin solution "Crisvon MP-829H" manufactured by Dainippon Ink and Chemicals Incorporated | 20 |
| Isocyanate type crosslinking agent "Crisvon CL-10" manufactured by Dainippon Ink and Chemicals Incorporated | 1 |
| Film-forming auxiliary "Crisvon SD-17B" manufactured by Dainippon Ink and Chemicals Incorporated | 2 |
| N,N-dimethylformamide | 27 |

Layered Product 5

The woven fabric C of nylon plain weave construction was subjected to the water repellent treatment. The water repellent treatment is performed to prevent the acrylic resin solution described below from penetrating through the fabric when the solution is applied to the fabric. A dispersion liquid was prepared by mixing 5% by mass of a water repellent ("DIC Guard NH-10" manufactured by Dainippon Ink and Chemicals Incorporated) and 95% by mass of mineral turpentine, and applied to the surface of the woven fabric C in an amount of more than saturation amount with a kiss coater. The excess dispersion liquid was removed by pressing with a mangle roll. In this time, an amount of dispersion liquid applied was about 25 g/m$^2$. The fabric was then dried in a hot-air circulation type oven at the conditions of 150° C. and 60 seconds.

To one side of the woven fabric C after the water repellent treatment, the acrylic resin solution having the composition listed in Table 2 was applied with a floating doctor-knife coater such that an applied amount was 40 g/m$^2$. The woven fabric C after application was dried with a hot air at 90° C. for 40 seconds to form an acrylic resin layer on the side of the woven fabric C.

Next, on the other surface of the acrylic resin layer (corresponding to the side to be subjected to the sealing treatment when the layered product is processed into a textile product), the woven fabric A of nylon plain weave construction was layered similarly as in the layered product 1 to give a three-layer layered product 5.

TABLE 2

| Ingredient | Content (parts by mass) |
|---|---|
| acrylic resin solution "Criscoat AC-100" manufactured by Dainippon Ink and Chemicals Incorporated | 82 |
| Isocyanate type crosslinking agent "Crisvon NX" manufactured by Dainippon Ink and Chemicals Incorporated | 2 |
| toluene | 16 |

Layered Product 6

A three-layer layered product 6 was obtained at the same conditions as in the layered product 1, except that a woven fabric E of nylon plain weave construction having a total cover factor of the warp and the weft of 1352 (fineness of both the warp and the weft: 17 dtex, the number of filaments of both the warp and the weft: five, density of the warp: 182 counts/2.54 cm, density of the weft: 146 counts/2.54 cm, weight per unit area: 30 g/m$^2$) was used instead of the woven fabric laminated on the side to be subjected to the sealing treatment in the layered product 1.

Layered Product 7

The woven fabric A laminated on the side to be subjected to the sealing treatment in the layered product 1 was also applied with the water repellent dispersion liquid mixture used in the layered product 1 in an amount of more than saturation amount with a kiss coater. The excess dispersion liquid was removed by pressing with a mangle roll. In this time, an amount of dispersion liquid absorbed in the fabric was about 15 g/m$^2$. The fabric was then dried in a hot-air circulation type oven at the conditions of 130° C. and 30 seconds to give a layered product 7.

Layered Product 8

The surface of the woven fabric A laminated on the side to be subjected to the sealing treatment in the layered product 2 was similarly subjected to the water repellent treatment as in the layered product 7 to give a layered product 8.

Layered Product 9

The surface of the woven fabric D laminated on the side to be subjected to the sealing treatment in the layered product 3 was similarly subjected to the water repellent treatment as in the layered product 7 to give a layered product 9.

Layered Product 10

The surface of the woven fabric A laminated on the side to be subjected to the sealing treatment in the layered product 4 was similarly subjected to the water repellent treatment as in the layered product 7 to give a layered product 10.

Layered Product 11

The surface of the woven fabric E layered on the side to be subjected to the sealing treatment in the layered product 6 was similarly subjected to the water repellent treatment as in the layered product 7 to give a layered product 11.

Layered Product 12

Figure 6:
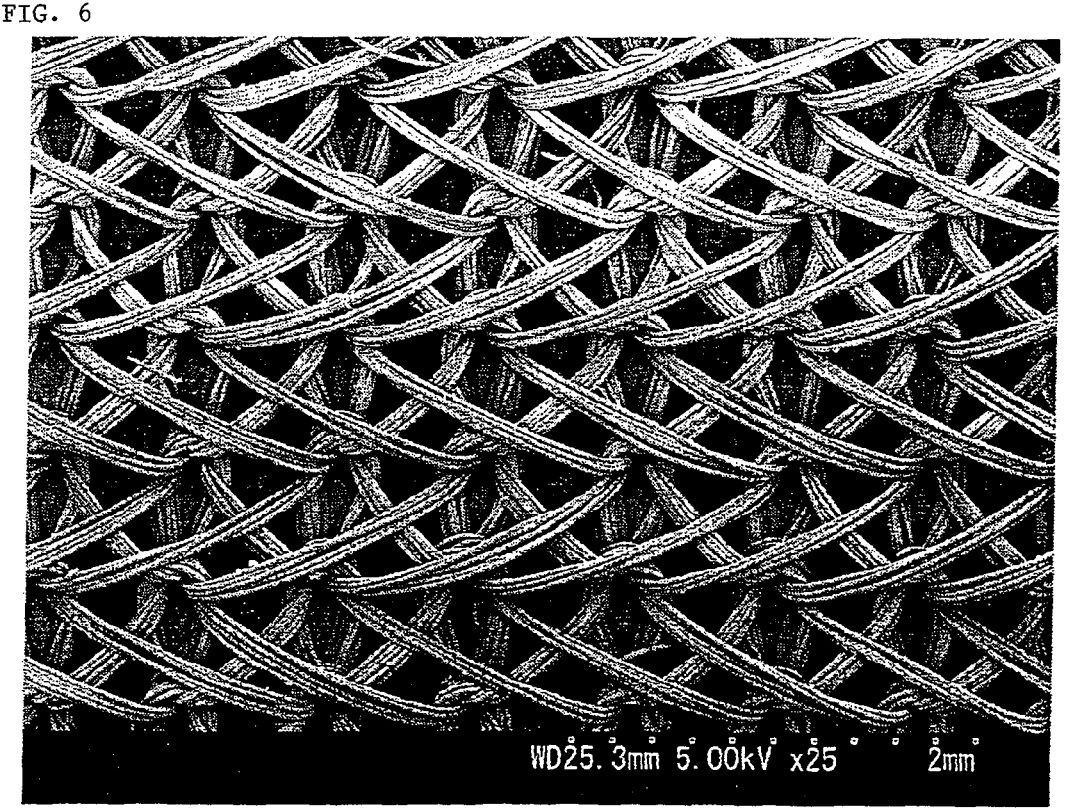
FIG. 6 is an electron micrograph of the side subjected to the sealing treatment of a layered product 12.

A three-layer layered product 12 was obtained at the same conditions as in the layered product 1, except that a tricot knit F of nylon 66 yarns (fineness of both wales and courses: 22 dtex, density of wales: 36 counts/2.54 cm, density of courses: 50 counts/2.54 cm, weight per unit area: 33 g/m$^2$) was used instead of the woven fabric laminated on the side to be subjected to the sealing treatment in the layered product 1 and an amount of adhesive transferred in laminating was 8 g/m$^2$. FIG. 6 shows an electron micrograph of the tricot knit laminated on the side subjected to the sealing treatment of the layered product 12 (magnification: 25).

Layered Product 13

A three-layer layered product 13 was obtained at the same conditions as in the layered product 12, except that the woven fabric C was used instead of the woven fabric B in the layered product 12.

Layered Product 14

A waterproof and moisture-permeable composite film having an abrasion resistant layer composed of a hydrophilic polyurethane resin, which was disclosed in Example 1 in Japanese Patent No. 3346567 (Example 1 in U.S. Pat. No. 5,209,969), was prepared. The hydrophilic polyurethane resin was used as a component of abrasion resistant polymer dots.

At the condition of 45° C., to 244 parts by mass of an ethylene/propylene oxide polyol was added 100 parts by mass of hexamethylenediamine (HMD). The resultant mixture was bubbled with $CO_2$ to produce a paste containing 35% by mass of solid content. The paste was monitored for decrease of free HMD by titration until the whole HMD in the paste was converted to HMD carbamate, and immediately quenched when free HMD was exhausted.

Then, to 126 parts by mass of a polyurethane prepolymer, which was a reaction product of 43 parts by mass of diphenylmethane diisocyanate and 83 parts by mass of polytetramethylene glycol, 31 parts by mass of the paste was added at room temperature to give a mixture liquid containing polyurethane prepolymer and HMD carbamate. The resultant mixture liquid contained 7% by mass of HMD carbamate.

The mixture liquid adjusted to 70° C. was applied to the surface of the porous PTFE film having the hydrophilic polyurethane resin layer formed thereon used in the layered product 1 by gravure/printing so that an amount applied was 15 g/m$^2$. A gravure roll used had a density of 8 lines/2.54 cm and an opening area ratio of 40% (circular dots with a diameter of 2.1 mm were arranged in a fine hexagonal continuous pattern at positions of vertexes and a center of each hexagons with an interval of 3.175 mm between the centers of adjacent dots). The film after applying the mixture liquid was heated on a hot plate set to 180° C. to cure the polyurethane resin applied, and a flexible waterproof and moisture-permeable film having abrasion resistant polymer dots on one side (corresponding to the side to be subjected to the sealing treatment in processing the layered product into a textile product) was obtained.

The woven fabric B was layered on the waterproof and moisture-permeable film thus obtained and subjected to the water repellent treatment at the same conditions as in the layered product 1 to give a double-layer layered product 14.

Layered Product 15

A three-layer layered product 15 was obtained at the same conditions as in the layered product 1, except that a woven fabric G of nylon plain weave construction having a total cover factor of the warp and the weft of 1480 (fineness of both the warp and the weft: 17 dtex, density of the warp: 165 counts/2.54 cm, density of the weft: 194 counts/2.54 cm, weight per unit area: 27 g/m$^2$) was laminated on the side to be subjected to the sealing treatment in the layered product 1.

Layered Product 16

A three-layer layered product 16 was obtained at the same conditions as in the layered product 1, except that a woven fabric H of nylon plain weave construction having a total cover factor of the warp and the weft of 1436 (fineness of both the warp and the weft: 33 dtex, the number of filaments of the warp: six, the number of filaments of the weft: ten, density of the warp: 126 counts/2.54 cm, density of the weft: 124 counts/2.54 cm, weight per unit area: 28 g/m$^2$) was used instead of the woven fabric laminated on the side to be subjected to the sealing treatment in the layered product 1.

Layered Product 17

A layered product 17 was prepared by subjecting the surface of the tricot knit F in the layered product 12 to the same water repellent treatment as of the layered product 7.

Layered Product 18

A layered product 18 was prepared by subjecting the surface of the tricot knit F in the layered product 13 to the same water repellent treatment as of the layered product 7.

Layered Product 19

A layered product 19 was prepared by subjecting the side of the porous PTFE film on which dots were provided in the layered product 14 to the same water repellent treatment as of the layered product 7.

Layered Product 20

A layered product 20 was prepared by subjecting the surface of the woven fabric G in the layered product 15 to the same water repellent treatment as of the layered product 7.

Layered Product 21

A layered product 21 was prepared by subjecting the surface of the woven fabric H in the layered product 16 to the same water repellent treatment as of the layered product 7.

Layered Product 22

It was intended to prepare a layered product at the same conditions as in the layered product 1, except that a woven fabric I of nylon plain weave construction having a total cover factor of the warp and the weft of 688 (fineness of both the warp and the weft: 17 dtex, the number of filaments of both the warp and the weft: five, density of the warp: 99 counts/2.54 cm, density of the weft: 68 counts/2.54 cm, weight per unit area: 16 g/m$^2$) was used instead of the woven fabric A in the layered product 1. However, in a laminating step, many texture gaps and wrinkles occurred on the surface of the woven fabric I to cause poor appearance, and hence the layered product could not be prepared.

The resultant layered products 1 to 21 themselves and sealed portion thereof were subjected to the tests. Results are listed in Tables 3 to 4.

TABLE 3

| | | Woven fabric on the side of the sealing treatment | | | | | | | Cloth on the opposite side of the sealing treatment |
|---|---|---|---|---|---|---|---|---|---|
| | | fineness (dtex) | | Density (counts/2.54 cm) | | Cover Factor | | | |
| Layered Product | Symbol | Warp | Weft | Warp | Weft | $CF_M$ | $CF_T$ | $CF_{TOTAL}$ | Symbol |
| Layered Product 1 | Woven fabric A | 17 | 17 | 138 | 133 | 569 | 548 | 1117 | Woven fabric B |
| Layered Product 2 | Woven fabric A | 17 | 17 | 138 | 133 | 569 | 548 | 1117 | Woven fabric C |

TABLE 3-continued

| | | Woven fabric on the side of the sealing treatment | | | | | | | Cloth on the opposite side of the sealing treatment |
|---|---|---|---|---|---|---|---|---|---|
| | | fineness (dtex) | | Density (counts/2.54 cm) | | Cover Factor | | | |
| Layered Product | Symbol | Warp | Weft | Warp | Weft | $CF_M$ | $CF_T$ | $CF_{TOTAL}$ | Symbol |
| Layered Product 3 | Woven fabric D | 33 | 33 | 121 | 101 | 695 | 580 | 1275 | Woven fabric B |
| Layered Product 4 | Woven fabric A | 17 | 17 | 138 | 133 | 569 | 548 | 1117 | Woven fabric C |
| Layered Product 5 | Woven fabric A | 17 | 17 | 138 | 133 | 569 | 548 | 1117 | Woven fabric C |
| Layered Product 6 | Woven fabric E | 17 | 17 | 182 | 146 | 750 | 602 | 1352 | Woven fabric B |
| Layered Product 7 | Woven fabric A | 17 | 17 | 138 | 133 | 569 | 548 | 1117 | Woven fabric B |
| Layered Product 8 | Woven fabric A | 17 | 17 | 138 | 133 | 569 | 548 | 1117 | Woven fabric C |
| Layered Product 9 | Woven fabric D | 33 | 33 | 121 | 101 | 695 | 580 | 1275 | Woven fabric B |
| Layered Product 10 | Woven fabric A | 17 | 17 | 138 | 133 | 569 | 548 | 1117 | Woven fabric C |
| Layered Product 11 | Woven fabric E | 17 | 17 | 182 | 146 | 750 | 602 | 1352 | Woven fabric B |
| Layered Product 12 | Knit F | — | — | — | — | — | — | — | Woven fabric B |
| Layered Product 13 | Knit F | — | — | — | — | — | — | — | Woven fabric C |
| Layered Product 14 | Abrasion resistant layer | — | — | — | — | — | — | — | Woven fabric B |
| Layered Product 15 | Woven fabric G | 17 | 17 | 165 | 194 | 680 | 800 | 1480 | Woven fabric B |
| Layered Product 16 | Woven fabric H | 33 | 33 | 126 | 124 | 724 | 712 | 1436 | Woven fabric B |
| Layered Product 17 | Knit F | — | — | — | — | — | — | — | Woven fabric B |
| Layered Product 18 | Knit F | — | — | — | — | — | — | — | Woven fabric C |
| Layered Product 19 | Abrasion resistant layer | — | — | — | — | — | — | — | Woven fabric B |
| Layered Product 20 | Woven fabric G | 17 | 17 | 165 | 194 | 680 | 800 | 1480 | Woven fabric B |
| Layered Product 21 | Woven fabric H | 33 | 33 | 126 | 124 | 724 | 712 | 1436 | Woven fabric B |
| Layered Product 22 | Woven fabric I | 17 | 17 | 99 | 68 | 408 | 280 | 688 | Woven fabric B |

Table 3 shows cover factors of woven fabrics arranged on the side to be subjected to the sealing treatment in processing the resultant layered products into textile products. In the layered products 12 to 14 and 17 to 19, cover factors could not be calculated, because they each had the tricot knit or the abrasion resistant layer on the side to be subjected to the sealing treatment.

TABLE 4

| | Water resistant of sealed portion (initial state) | | Water resistant of sealed portion (after washed 20 times) | |
|---|---|---|---|---|
| Layered Product | tape of 150 μm thickness | tape of 100 μm thickness | tape of 150 μm thickness | tape of 100 μm thickness |
| Layered Product 1 | non-defective | non-defective | non-defective | non-defective |
| Layered Product 2 | non-defective | non-defective | non-defective | non-defective |
| Layered Product 3 | non-defective | non-defective | non-defective | non-defective |
| Layered Product 4 | non-defective | non-defective | non-defective | non-defective |
| Layered Product 5 | non-defective | non-defective | non-defective | non-defective |
| Layered Product 6 | non-defective | non-defective | non-defective | defective |
| Layered Product 7 | non-defective | non-defective | non-defective | non-defective |
| Layered Product 8 | non-defective | non-defective | non-defective | non-defective |
| Layered Product 9 | non-defective | non-defective | non-defective | non-defective |
| Layered Product 10 | non-defective | non-defective | non-defective | non-defective |
| Layered Product 11 | non-defective | non-defective | non-defective | defective |
| Layered Product 12 | non-defective | non-defective | non-defective | defective |
| Layered Product 13 | non-defective | non-defective | non-defective | defective |
| Layered Product 14 | non-defective | non-defective | non-defective | non-defective |
| Layered Product 15 | defective | defective | defective | defective |
| Layered Product 16 | defective | defective | defective | defective |
| Layered Product 17 | non-defective | non-defective | defective | defective |
| Layered Product 18 | non-defective | non-defective | defective | defective |
| Layered Product 19 | non-defective | non-defective | defective | defective |
| Layered Product 20 | defective | defective | defective | defective |
| Layered Product 21 | defective | defective | defective | defective |

Table 4 shows results of evaluation for water resistance of sealed portion of the resultant layered products. As clearly seen in Table 4, in the layered products 1 to 11 in which woven fabrics laminated on the side to be subjected to the sealing treatment had cover factors from 700 to 1400, sealed portions are good in water resistance at initial state and after washed 20 times, and thus waterproof effects by the sealing treatment are good.

On the other hand, in the layered products 15 and 16 using nylon plain woven fabrics like as fabrics used in the face side of conventional layered products as the woven fabrics layered on the surface to be subjected to the sealing treatment, sealed portions had low water resistance at initial state, and it is found that a waterproof effect by the sealing treatment cannot be achieved. The reason is thought as that the nylon plain woven fabrics like as fabrics conventionally used in the face side are too fine in texture, and hence impregnation of the hot melt resin of the sealing tape is insufficient. In the layered products 6 and 11, water resistance after washed 20 times of sealed portions are decreased. However, this level equals to the level of water resistance of sealed portions of the layered products 12 and 13 having the same construction of a currently commercialized product, and has no problem in practice. In the layered products 7 to 11, it is found that a woven fabric on the side to be subjected to the sealing treatment could not achieve a waterproof effect by the sealing treatment, although it was subjected to the water repellent treatment. In the layered products 17 to 21, which had the same construction as of a currently commercialized product and were subjected to the water repellent treatment on the woven fabric, the knit, or the abrasion resistant layer at the side to be subjected to the sealing treatment, sealed portion had decreased water resistance after washed 20 times, and it is found that a water proof effect by the sealing treatment is insufficient. When using a layered product in rainwear garments and the like, the layered product is generally used in the direction that the side subjected to the sealing treatment faces inwardly (to the body side). When a rainwear garment is used in rainy weather, a phenomenon (wicking) occurs. Wicking is that rainwater enters into the inside of the rainwear garment from openings (sleeve edges and the bottom) thereof and penetrates into a fabric inside of the rainwear garment. The phenomenon can be prevented by subjecting the fabric inside of the rainwear garment (fabric on the side to be subjected to the sealing treatment) to the water repellent treatment. However, when the fabric on the side to be subjected to the sealing treatment is previously subjected to the water repellent treatment, the sealing treatment conducted after sewing of the rainwear garment is adversely affected. The conventional techniques thus have a problem of hardly providing effective countermeasures for wicking. Since the layered product of the present invention can achieve a waterproof effect by the sealing treatment even when the woven fabric to be subjected to the sealing treatment is subjected to the water repellent treatment, it is very useful from the point of prevention of wicking.

Further, in comparison of the layered products 1 and 2 with the layered products 12 and 13, the layered products 1 and 2 can achieve waterproof effects by the sealing treatment in either the hot melt resin layer having a thickness of 100 μm or 150 μm, while the layered products 12 and 13, which are conventional examples, have defective water resistance after washed 20 times when the sealing tape has a hot melt resin layer of a 100 μm thickness. The result suggests that, according to the present invention, an amount of the hot melt resin in the sealing tape used can be reduced, and thus costs for preparing a textile product by processing the layered product of the present invention and subjecting the sealing treatment can be reduced.

in the layered products 7 to 11 and 17 to 21 in which fabrics laminated on the sides to be subjected to the sealing treatment were subjected to the water repellent treatment, similar results as follows (except dehydration) were obtained.

[Weight Reduction]

For weight reduction, layered products having the same construction except woven fabrics layered on the side to be subjected to the sealing treatment are compared. For example, the layered product 1 has a layered nylon woven fabric of plain weave having a total cover factor of the warp and the weft of 1117 on the side to be subjected to the sealing treatment, while the layered product 12 has a layered tricot knit instead of the nylon woven fabric of plain weave. Since the layered product 1 has a mass of 78 g/m$^2$ and the layered product 12 has a mass of 93 g/m$^2$, it is found that weight reduction of about 16% is achieved. The layered product 2 and the layered product 13 are also similarly compared. Since the layered product 2 has a mass of 118 g/m$^2$ and the layered product 13 has a mass of 131 g/m$^2$, it is found that weight reduction of about 10% can be achieved. As clearly seen from the results, according to the present invention, a layered product can have a reduced weight. There is a need of weight reduction particularly for outdoor gear such as rainwear garments, bags, tents, and sleeping bags, and thus the present invention is preferably applicable.

[Moisture-Permeable Property]

It is found that the layered products 1 to 4, and 6 each have a moisture-permeable property of not less than 300 g/m$^2$ h, and have no problem in practice. It is also found that particularly the layered products 1 to 3 and 6 each using the porous PTFE film as the waterproof and moisture-permeable film are excellent in moisture-permeable property. The reason that the layered product 5 has a low moisture-permeable property is that the acrylic resin layer of a low moisture-permeable property was used as the flexible film.

[Tear Strength and Tensile Strength]

For tear strength and tensile strength, layered products having the same construction except woven fabrics layered on the side to be subjected to the sealing treatment are compared. Each tear strength of the layered products 1 and 2 is lower than each tear strength of the layered products 12 and 13, but stronger than 10 N that is a level required for work clothing (relatively high strength is required) and has no problem in practice. Each tensile strength of the layered products 1 and 2 is almost same level to each tensile strength of the layered products 12 and 13 and has no problem in practice. In con-

TABLE 5

| Layered Product | Thickness (mm) | Mass (g/m$^2$) | Moisture-Permeability (g/m$^2$ · hr) | Tear Strength (N) Warp | Tear Strength (N) Weft | Tensile Strength (N/5 cm) Warp | Tensile Strength (N/5 cm) Weft | Friction Coefficient Static friction Coefficient | Friction Coefficient Dynamic friction Coefficient | Dehydration (g/m$^2$) | Velocro abrasion resistance |
|---|---|---|---|---|---|---|---|---|---|---|---|
| Layered Product 1 | 0.22 | 78 | 600 | 12.6 | 10.6 | 370 | 270 | 0.470 | 0.407 | 26.4 | non-defective |
| Layered Product 2 | 0.24 | 118 | 570 | 19.8 | 16.5 | 790 | 480 | 0.528 | 0.477 | 26.6 | non-defective |
| Layered Product 3 | 0.23 | 91 | 600 | 17.4 | 15.2 | 600 | 470 | 0.440 | 0.374 | 29.1 | non-defective |
| Layered Product 4 | 0.24 | 121 | 310 | 21.1 | 17.5 | 810 | 470 | 0.518 | 0.494 | 26.1 | non-defective |
| Layered Product 5 | 0.23 | 97 | 60 | 22.0 | 17.8 | 820 | 460 | 0.505 | 0.478 | 23.4 | non-defective |
| Layered Product 6 | 0.23 | 82 | 600 | 16.6 | 12.2 | 500 | 400 | 0.461 | 0.420 | 26.8 | non-defective |
| Layerd Product 12 | 0.29 | 93 | 460 | 18.9 | 12.3 | 300 | 270 | 0.920 | 0.725 | 30.2 | defective(damage) |
| Layerd Product 13 | 0.31 | 131 | 470 | 26.2 | 17.1 | 840 | 550 | 0.933 | 0.766 | 29.8 | defective(damage) |
| Layerd Product 14 | 0.27 | 77 | 570 | 9.0 | 6.0 | 260 | 220 | 2.03 | 1.97 | 9.6 | defective(damage) |
| Layerd Product 15 | 0.21 | 86 | 660 | 15.6 | 11.2 | 460 | 490 | 0.452 | 0.381 | 29.4 | non-defective |
| Layerd Product 16 | 0.23 | 96 | 550 | 20.1 | 17.5 | 610 | 490 | 0.430 | 0.355 | 29.7 | non-defective |

Table 5 shows results of evaluations of the resultant layered products 1 to 6 and 12 to 16 for a thickness, mass, moisture-permeable property, tear strength, tensile strength, friction coefficient, dehydration, and Velcro abrasion resistance. Also trast, the layered product 14 in which a fabric was not layered but the abrasion resistant polymer dots were provided on the side to be subjected to the sealing treatment is found to have reduced tear strength and tensile strength.

[Friction Coefficient]

The layered products 1 to 3 each have friction coefficients near to or lower than 0.5, and show good slip properties. In contrast, the layered products 12 and 13 have high friction coefficients. The cause is thought as that knit textures layered on the sides to be subjected to the sealing treatment catches each other. The layered product 14 has a higher friction coefficient. The cause is thought to be frictional resistance and catching derived from the abrasion resistant polymer dots provided on the side to be subjected to the sealing treatment. Since a level of friction coefficient has a large effect on wearing feeling such as putting on and taking off and easiness to move when worn, it can be said that a garment using the layered product of the present invention has a wearing feeling largely improved from that of a garment using a conventional layered product.

[Dehydration]

From comparison of the layered products 1 and 2 with the layered products 12 and 13, it is found that water adhesion amounts of the layered products 1 and 2 after dewatering were less than that of the layered products 12 and 13. A low water adhesion amount after dewatering means that clothes (layered product) wetted by, for example, rainfall during mountain climbing or laundering can be quickly dried after dewatering. The layered product of the present invention has a low water adhesion amount after dewatering, and is found to be suitable for outdoor clothes and the like.

[Velcro Abrasion Resistance]

Velcro abrasion resistance means the abrasion resistance of a lining of a layered product constructing a cloth against Velcro fastenings including Magic Tape (registered trademark). The layered product of the present invention is excellent in Velcro abrasion resistance as described below. In any of the layered products 1 to 6 subjected to the test of Velcro abrasion resistance, no defect occurred in appearance. In the layered products 12 and 13, tricot knits layered on the sides to be subjected to the sealing treatment were damaged. In the layered product 14, the porous PTFE film was damaged. Those damages can reduce waterproof properties, and thus using a Velcro fastening for a garment may lower the waterproof property.

[Evaluation in Clothes]

The layered product 1 was used and sewn to make an outdoor jacket. Sewing was conducted as shown in FIG. 2, in which a width of margin to seam was 7 mm, and the margin to seam was folded back and sewed by double stitching along the edge of the seam. A sewing yarn used was a polyester yarn (50 counts). The sewed portion was subjected to the sealing treatment with a sealing tape (Gore-seam Tape manufactured by Japan Gore-Tex, a resin flow value at 180° C.: $100\times10^{-3}$ cm$^3$/sec, respective resin thicknesses: 100 μm and 150 μm, thickness of resins: 100 μm, width: 22 mm) by using a hot air sealer ("5000E" manufactured by W. L. Gore & Associates, Inc.) at the conditions of a set temperature 700° C. and a processing velocity 4 m/min. Next, an outdoor jacket having the same shape was sewed using the layered product 12. The jacket was obtained at the same conditions as of the layered product 1, except that a sealing tape in which a thickness of resin was 150 μm (Gore-seam Tape manufactured by Japan Gore-Tex, a resin flow value at 180° C.: $100\times10^{-3}$ cm$^3$/sec, width: 22 mm) was used. In comparison of masses of the resultant jackets, the jacket made of the layered product 1 was 340 g, and the jacket made of the layered product 12 was 410 g. From the comparison, it is found that the jacket made of the layered product 1 was reduced in weight by about 17% from the jacket made of the layered product 12. In observation of appearance of the sealed portion of the jackets, a sealed portion in the jacket made of the layered product 1 was not so apparent, but a sealed portion in the jacket made of the layered product 12 rucked at the edge portion of the sealing tape and the sealing tape was conspicuous.

INDUSTRIAL APPLICABILITY

The layered product of the present invention is suitable for use in textile products such as garments, sheets, tents, and sleeping bags, and textile products required to have waterproof and moisture-permeable properties (e.g., medical waterproof sheets, and outdoor products such as garments, tents, and sleeping bags).

The invention claimed is:

1. A layered textile product comprising:
a flexible film;
a woven fabric laminated on the flexible film; and
a sealing tape comprising a hot melt resin on a surface of said woven fabric, said sealing tape covering a sewn portion of said layered textile product,
wherein said hot melt resin is impregnated into said surface of said woven fabric, and
wherein the woven fabric has a total cover factor ($CF_{total}$) from 700 to 1300, calculated from the cover factors of the warp and the weft constituting the woven fabric, according to the following formula:

$$CF_{total}=CF_m+CF_t$$

$$CF_m=\sqrt{F_m}\times D_m \text{ and}$$

$$CF_t=\sqrt{F_t}\times D_t, \text{ wherein}$$

$CF_m$: cover factor of the warp
$CF_t$: cover factor of the weft
$F_m$: fineness of the warp (dtex)
$F_t$: fineness of the weft (dtex)
$D_m$: density of the warp (counts/2.54 cm) and
$D_t$: density of the weft (counts/2.54 cm).

2. The layered product according to claim 1, wherein at least one of the cover factor of the warp ($CF_m$) and the cover factor of the weft ($CF_t$) is in a range from 300 to 800.

3. The layered product according to claim 2, wherein at least one of the warp and the weft constituting the woven fabric is made of two or more filaments.

4. The layered product according to claim 1, wherein at least one of the warp and the weft constituting the woven fabric is a long-fiber.

5. The layered product according to claim 1, wherein at least one of the warp and the weft constituting the woven fabric is a textured yarn.

6. The layered product according to claim 1, wherein the flexible film is a waterproof film.

7. The layered product according to claim 1, wherein the flexible film is a waterproof and moisture-permeable film.

8. The layered product according to claim 7, wherein the waterproof and moisture-permeable film is a porous film consisting of a hydrophobic resin.

9. The layered product according to claim 8, wherein the porous film consisting of the hydrophobic resin has a hydrophilic resin layer on a side to which the woven fabric is laminated.

10. The layered product according to claim 9, wherein the porous film consisting of the hydrophobic resin is a porous polytetrafluoroethylene film.

11. The layered product according to claim 9, wherein the flexible film further comprises a cloth laminated on the side opposite to the side on which the woven fabric is laminated.

12. The layered product according to claim 8, wherein the porous film consisting of the hydrophobic resin is a porous polytetrafluoroethylene film.

13. The layered product according to claim 12, wherein the flexible film further comprises a cloth laminated on the side opposite to the side on which the woven fabric is laminated.

14. The layered product according to claim 1, wherein the flexible film further comprises a cloth laminated on the side opposite to the side on which the woven fabric is laminated.

15. The layered product according to claim 1, wherein a fineness of the filament is not more than 12 dtex.

16. The layered product according to claim 1, wherein the woven fabric has a plain weave construction.

17. The layered product according to claim 1, further comprising a cloth on said flexible film on a side opposing said woven fabric.

18. The layered textile product according to claim 1, wherein fibers constituting said woven fabric are selected from the group consisting of natural fibers, synthetic fibers and combinations thereof.

19. The layered textile product according to claim 1, wherein fibers constituting said woven fabric are synthetic fibers selected from polyamide fibers, polyester fibers, acrylic fibers, ceramic fibers, and metal fibers.

20. The layered textile product according to claim 1, wherein the woven fabric has a construction selected from the group consisting of a twill weave, a satin weave, a plain weave and a rip-stop weave.

21. The layered textile product according to claim 1, wherein at least one of the warp and the weft constituting the woven fabric is made of two or more filaments and the fineness of said filaments is at least 5 dtex.

22. A layered textile product comprising:
a flexible film;
a woven fabric laminated on the flexible film; and
a sealing tape comprising a hot melt resin on a surface of said woven fabric, said sealing tape covering a sewn portion of said layered textile product,
wherein said hot melt resin is impregnated into said surface of said woven fabric,
wherein the woven fabric has a total cover factor ($CF_{total}$) from 700 to 1300, calculated from the cover factors of the warp and the weft constituting the woven fabric, according to the following formula:

$$CF_{total} = CF_m + CF_t$$

$$CF_m = \sqrt{F_m} \times D_m \text{ and}$$

$$CF_t = \sqrt{F_t} \times D_t, \text{ wherein}$$

$CF_m$: cover factor of the warp
$CF_t$: cover factor of the weft
$F_m$: fineness of the warp (dtex)
$F_t$: fineness of the weft (dtex)
$D_m$: density of the warp (counts/2.54 cm) and
$D_t$: density of the weft (counts/2.54 cm),
wherein at least one of the warp and the weft constituting the woven fabric is made of two or more filaments and the fineness of the filament is at least 5 dtex,
wherein the woven fabric has a construction selected from the group consisting of a twill weave, a satin weave, a plain weave and a rip-stop weave.

23. The layered textile product according to claim 22, wherein at least one of the warp and the weft constituting the woven fabric is a textured yarn.

* * * * *